Aug. 17, 1926.

A. E. FISHER

TRACTOR CHAIN

Filed April 22, 1925  2 Sheets-Sheet 1

1,596,820

A. E. Fisher
INVENTOR
BY Victor J. Evans
ATTORNEY

WITNESS

Aug. 17, 1926.                                    1,596,820
A. E. FISHER
TRACTOR CHAIN
Filed April 22, 1925          2 Sheets-Sheet 2
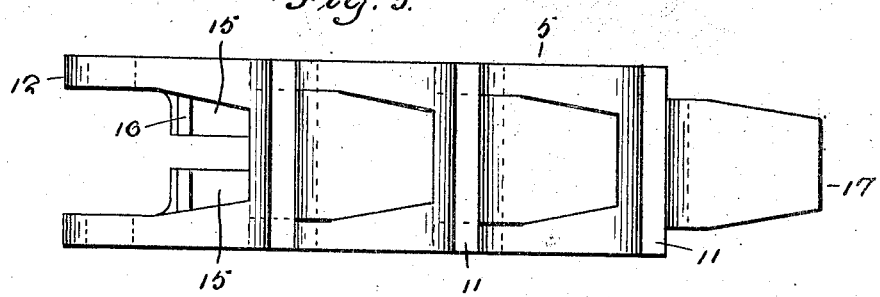
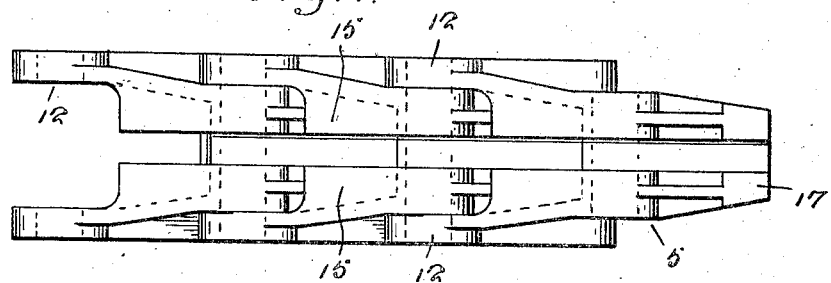
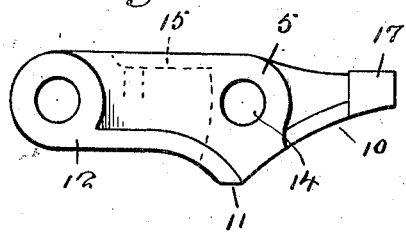
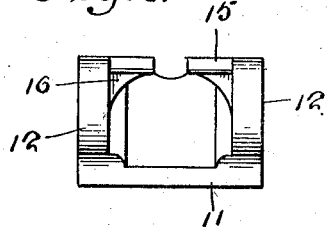
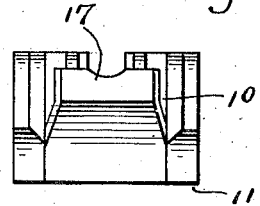
A. E. Fisher
INVENTOR Patented Aug. 17, 1926.

1,596,820

UNITED STATES PATENT OFFICE.

ADLAI E. FISHER, OF HAVEN, KANSAS.

TRACTOR CHAIN.

Application filed April 22, 1925. Serial No. 25,097.

My invention relates to a tractor chain and its principal object is to provide a tractor chain wherein the links are locked against movement as they leave the contour of the wheel and thus dispense with the usual intermediate wheels and the wear and loss of traction incident thereto.

The invention also contemplates a tractor chain which eliminates turning of the links while in contact with the ground.

Still another object of the invention is to provide a tractor chain wherein the links are so constructed and arranged that they will dislodge all mud and other foreign matter from the same as they engage the contour of the wheel.

With the preceding and other objects and advantages in mind, the invention consists in the novel combination of elements, construction, arrangement of parts and operations, to be hereinafter specifically referred to, claimed and illustrated in the accompanying drawings, wherein:

Figure 3 is an outer plan view.

Figure 4 is an inner plan view.

Figure 5 is a side elevation of one of the links.

Figure 6 is an end elevation of the same, and

Figure 7 is an end elevation of the link taken at the opposite end.

Figure 1:
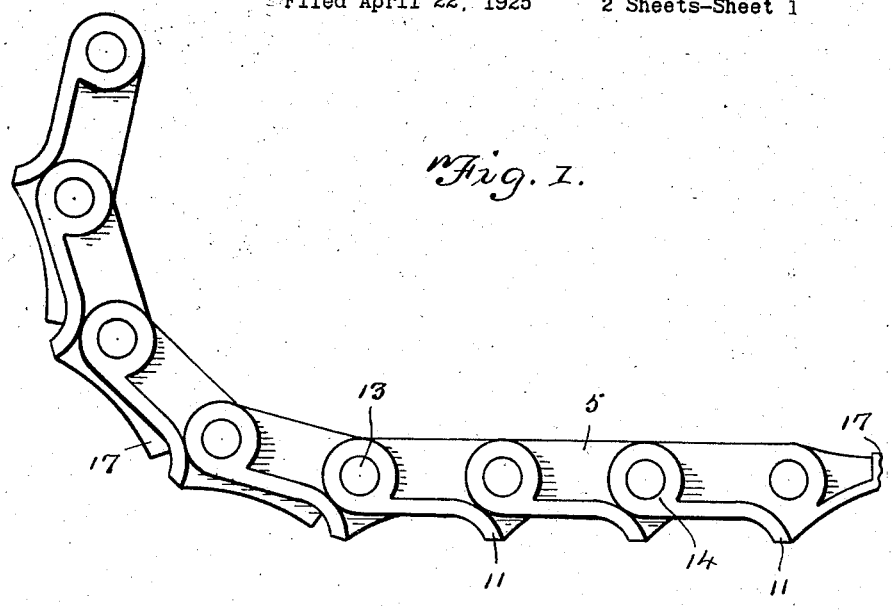
Figure 1 is a side elevation of a tractor chain constructed in accordance with my invention.
Figure 2:
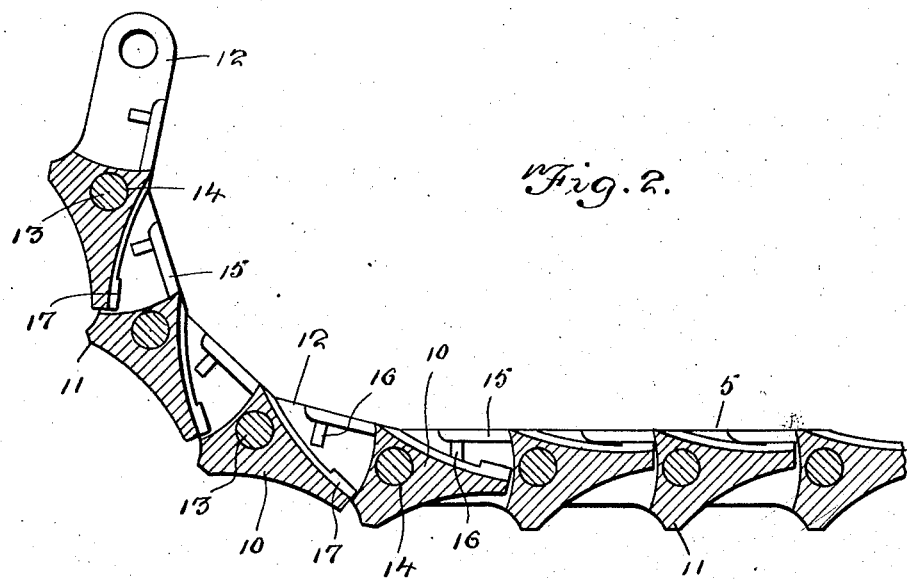
Figure 2 is a longitudinal sectional view of the same.

Referring to the drawings in detail wherein corresponding characters of reference denote corresponding parts throughout the several views, the numeral 5 designates one of a plurality of links with which my improved chain is formed. As all of these links are identical in construction, a detail description of one will apply to the entire number. This link comprises a casting substantially triangular shaped in cross section and indicated at 10 is formed with a ground engaging cleat 11 that extends transversely across the under face of one end thereof. Cast with the member 10 is a pair of forwardly extending parallel arms 12 that are pivotally connected to the part 10 of the link next in order through the medium of a pin 13 passing transversely through a bore or opening 14 in the part 10. Formed upon the inner faces of the arms 12 and extending from the inner upper ends of the part 10 are longitudinal shoulders 15 and extending at right angles to these shoulders are stops or lugs 16. These lugs 16 extend to and embrace the shoulders 15. Formed with the inner face of the forward end of the casting 10 is a lug 17 which engages the shoulders 15 as the links pass over the ground and hold the latter rigid as shown at the right of Figure 2.

As the chain constructed from the links above set forth pass around the drive wheels they will rock on their pivots causing the forward ends of the casting 10 to move between the arms and thereby dislodge any dirt or mud that has found itself in the space between these arms. Also as the links contact with the ground they are held rigid and eliminate noise of turning incident to such movement.

While I have shown and described the preferred embodiment of the invention, I desire to have it understood that such changes may be made in the form, construction, arrangement of parts and operations as will not depart from the spirit of the invention or the scope of the subjoined claim.

What is claimed is:—

A traction chain comprising a plurality of identical units each of which comprising a substantially V-shaped in cross section casting, a pair of forwardly extending arms carried thereby, a pivot passing through such arms and the body of the links next in order, a pair of inwardly directed shoulders on the arms, a lug extending from each shoulder at right angles thereto and adapted for bracing said shoulders, a lug carried by each of the castings and adapted to engage the shoulder of the adjacent link as the links pass over a horizontal surface, said lugs last mentioned being adapted to move between the arms and thereby dislodge any foreign matter from between the same.

In testimony whereof I affix my signature.

ADLAI E. FISHER.